United States Patent [19]

Dirauf et al.

[11] Patent Number: 5,118,462
[45] Date of Patent: Jun. 2, 1992

[54] MANIPULATOR FOR HANDLING OPERATIONS, PARTICULARLY FOR NON-DESTRUCTIVE TESTING

[75] Inventors: Franz Dirauf, Ebensfeld; Roland Gottfried, Neunkirchen, both of Fed. Rep. of Germany

[73] Assignee: Siemens Aktiengesellschaft, Munich, Fed. Rep. of Germany

[21] Appl. No.: 547,609

[22] Filed: Jun. 28, 1990

[30] Foreign Application Priority Data

Mar. 26, 1990 [DE] Fed. Rep. of Germany ... 9003515[U]

[51] Int. Cl.$^5$ .............................................. G21C 17/00
[52] U.S. Cl. .................................. 376/249; 73/866.5; 165/11.2
[58] Field of Search .................... 376/249, 245, 260; 976/DIG. 211, DIG. 213; 73/866.5, 622; 165/11.2; 901/15, 41; 414/146, 680

[56] References Cited

U.S. PATENT DOCUMENTS

| | | | |
|---|---|---|---|
| 4,474,064 | 10/1984 | Naruse et al. | 376/249 |
| 4,526,037 | 7/1985 | Wentzell et al. | 376/249 |
| 4,696,612 | 9/1987 | Germond et al. | 165/11.2 |

*Primary Examiner*—Daniel D. Wasil
*Attorney, Agent, or Firm*—Herbert L. Lerner; Laurence A. Greenberg

[57] ABSTRACT

A manipulator for handling operations for non-destructive testing in the vicinity of the nozzle of a vessel in the primary loop of a nuclear power plant includes a carriage being movable in circumferential direction of the nozzle of the vessel. A sled is disposed on the carriage and displaceable in the axial direction of the nozzle. A shoulder joint is disposed on the sled. A scissors half has an upper arm with one end supported in the shoulder joint and another end, a lower arm with a free end, another joint connecting the other end of the upper arm to the lower arm, a holder, and a further joint connecting the holder to the free end of the lower arm. A tool or a probe is disposed on the holder. A method for handling a device, especially a probe, in the vicinity of the nozzle of a vessel, especially in the primary loop of a nuclear power plant, with a manipulator, includes controlling the holder and the other joint along a predetermined path with a control device acting upon at least one drive motor, and varying a pivoting angle of at least one of the arms with at least one drive motor. The position of the sled may also be varied with a drive motor operatively connected to the sled.

15 Claims, 5 Drawing Sheets

MANIPULATOR FOR HANDLING OPERATIONS, PARTICULARLY FOR NON-DESTRUCTIVE TESTING

The invention relates to a manipulator for handling operations, particularly for non-destructive testing, in the vicinity of the nozzle of a vessel in the primary loop of a nuclear power plant. The invention also relates to a method for handling a device, in particular for handling a test head or probe.

The nozzles on the vessels in the primary loop are among the highly stressed parts of a nuclear power plant. The weld seams and the inner radius of the nozzles must therefore be tested regularly by non-destructive methods.

It is known to perform such tests with a manipulator that has an outrigger which is radial to the nozzle and a probe that is axially displaceable on the outrigger. The manipulator slides on an annular rail that surrounds the nozzle to be tested. In order to execute the required motions in the test operations, the manipulator has a respective drive mechanism for each of the circumferential and radial directions. The outrigger in the radial direction is pressed by mechanical devices against the outer vessel wall to be tested and is aligned tangentially. The vessel having the nozzle to be tested is surrounded by a biological shield and insulation. Since the gap between the vessel and the insulation or the biological shield is sometimes quite narrow, it is very difficult to introduce the conventional manipulator into the annular gap and in fact it is not always possible, because the required structural height of the known outrigger prevents its use with a very narrow annular gap.

During testing, the probe must be moved around the neck on concentric or elliptical paths. Due to testing technique requirements, it is necessary to use various probes, which must be manually changed in the course of a test. The testing is made more difficult by the increased radiation in the vicinity of the test specimen, and by the cramped conditions. In the known apparatus, changing the probe requires manual disassembly of the manipulator and is therefore very time-consuming and entails considerable radiation exposure to personnel. Moreover, it is not always possible to circumvent obstacles in the test region, because the radial outrigger has a bottom frame with a spindle extending over its entire length for moving the probe and as a result it projects quite far outward.

It is accordingly an object of the invention to provide a manipulator for handling operations, particularly for non-destructive testing, and a method for handling a device, which overcome the hereinafore-mentioned disadvantages of the heretofore-known methods and devices of this general type, which can be introduced into the annular gap more easily than before and which can also work in very narrow annular gaps. Moreover, the manipulator should make it possible to shorten the time required for changing the probe and for reducing the exposure load to operating personnel and the method should enable remote-controlled handling of a device by a manipulator under cramped conditions.

With the foregoing and other objects in view there is provided, in accordance with the invention, a manipulator for handling operations particularly for non-destructive testing in the vicinity of the nozzle of a vessel, especially in the primary loop of a nuclear power plant, comprising a carriage being movable in circumferential direction of a nozzle of a vessel, a sled being disposed on the carriage and displaceable in the axial direction of the nozzle, a shoulder joint disposed on the sled, a scissors half having an upper arm with one end supported in the shoulder joint and another end, a lower arm with a free end, another joint connecting the other end of the upper arm to the lower arm, a holder, a further joint connecting the holder to the free end of the lower arm, and a tool or a probe disposed on the holder.

In this way, a very slender structure is attained, which makes it possible to use the manipulator in cramped spaces, and above all enables good adaptation to the curvature of the annular gap in the region of the nozzle. Obstacles in the test region can be circumvented by retracting the outrigger, because the lower arm can not only be pivoted but can also be moved in the axial direction of the nozzle. The manipulator also not only makes it possible to drive along the test regions on the vessel but also along all of the test regions on the nozzle jacket. The arms of the manipulator can be positioned in three dimensions. The manipulator is therefore not only suitable for testing purposes, but also for handling operations on the nozzle and in the annular gap.

In accordance with another feature of the invention, there is provided a rack drive mechanism for displaceably supporting the shoulder joint on the sled.

In accordance with a further feature of the invention, the rack drive mechanism has a rack being disposed on the carriage and having a toothless guide element for rerailing and derailing the sled.

In accordance with an added feature of the invention, there is provided drive motor with a position transducer and a gear operatively connecting the drive motor and the sled for adjusting the position of the sled, and a control device connected to the position transducer, and/or another drive motor with another position transducer and another gear operatively connecting the other drive motor and the shoulder joint for adjusting a pivoting angle of the upper arm, the control device being connected to the other position transducer, and/or a further drive motor with a further position transducer and a further gear operatively connecting the further drive motor and the other joint for adjusting a pivoting angle between the upper and lower arms, the control device being connected to the further position transducer. The gears may be bevel gears.

In accordance with an additional feature of the invention, the other joint includes means for permitting the lower arm to be folded back onto the upper arm, and the shoulder joint includes means for permitting the upper arm to be folded onto the carriage.

In accordance with yet another feature of the invention, the lower arm has a shorter length than the upper arm, which is preferably approximately two-thirds the length of the upper arm.

In accordance with yet a further feature of the invention, there is provided an annular rail disposed concentrically about the nozzle of the vessel, and means for derailing the carriage from and rerailing the carriage onto the rail.

With the objects of the invention in view, there is also provided a method for handling a device, particularly a probe, in the vicinity of the nozzle of a vessel, especially in the primary loop of a nuclear power plant, with a manipulator, the manipulator including a carriage movable in circumferential direction of the nozzle, a sled being disposed on the carriage and displaceable in axial direction of the nozzle, a shoulder joint disposed on the sled, a scissors half having an upper arm with one end supported in the shoulder joint and another end, a lower arm with a free end, another joint connecting the other end of the upper arm to the lower arm, a holder, a further joint connecting the holder to the free end of the lower arm, and at least one drive motor operatively connected to at least one of the arms, and the method comprises controlling the holder and the other joint along a predetermined path with a control device acting upon the at least one drive motor, varying a pivoting angle of at least one of the arms with the at least one drive motor, optionally varying a position of the sled with a drive motor operatively connected to the sled, and optionally connecting a tool or a probe to the free end of the lower arm with the holder.

In accordance with another mode of the invention, there is provided a method which comprises controlling the other joint along a path at least approximately parallel to a surface to be tested.

In accordance with a concomitant mode of the invention, there is provided a method which comprises folding the lower arm back onto the upper arm and folding the upper arm onto the carriage, folding the probe or the tool onto the sled, changing the probe or the tool, and introducing or removing the manipulator through an opening in a biological shield into an annular gap between the vessel and the biological shield.

Other features which are considered as characteristic for the invention are set forth in the appended claims.

Although the invention is illustrated and described herein as embodied in a manipulator for handling operations, particularly for non-destructive testing, and a method for handling a device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
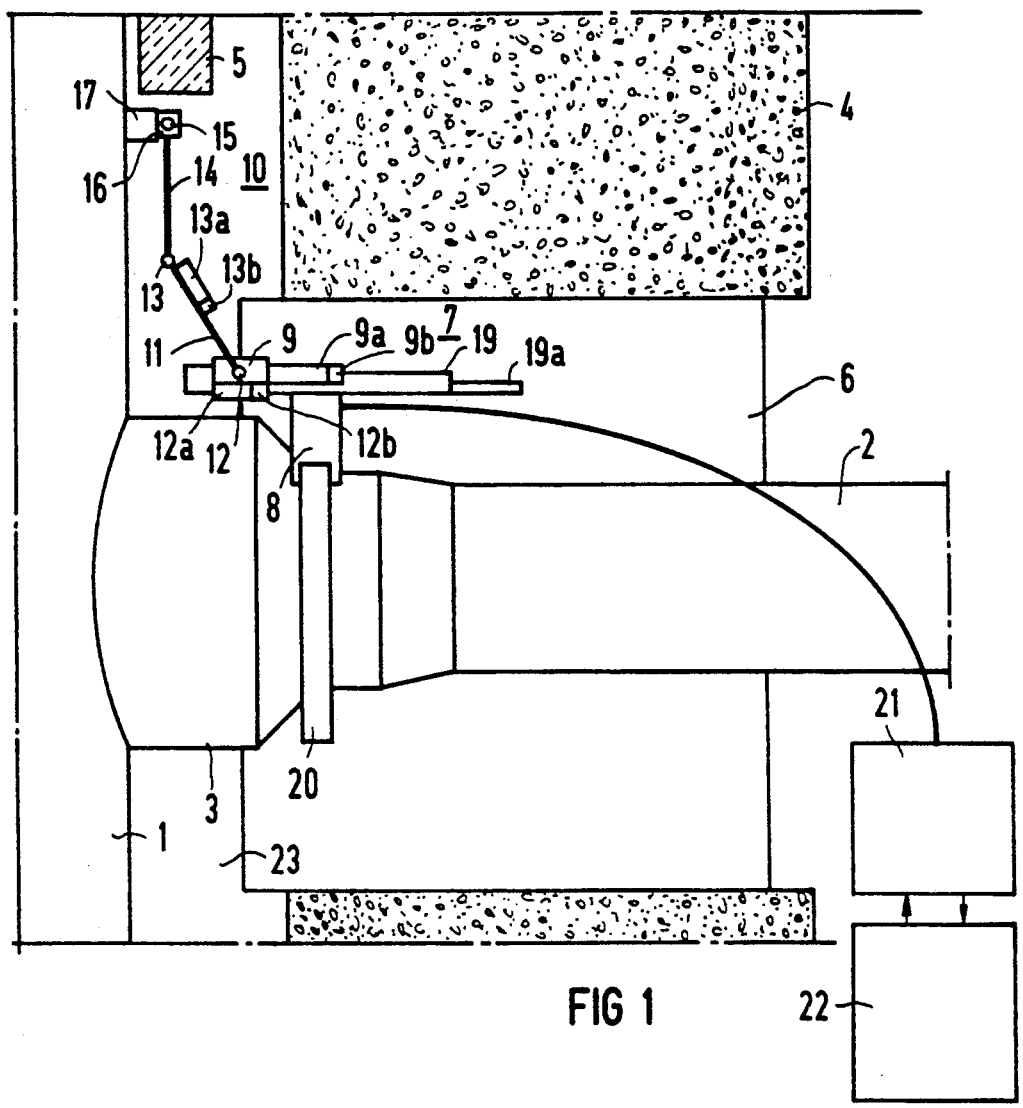
FIG. 1 is a fragmentary, diagrammatic, side-elevational view of a vessel and a basic illustration of a manipulator for testing a pipe nozzle discharging into a vessel.

Referring now to the figures of the drawings in detail and first, particularly, to FIG. 1 thereof, there is seen a pipe 2 which is introduced into a vessel or container 1 through a nozzle or stub 3. The vessel 1 is surrounded by a biological shield 4 and thermal insulation 5. The biological shield has an opening 6 at the point of discharge of the pipeline, that is rectangular in this case, but may also be round. In the region of the vessel 1 to be tested, the insulation must first be removed before the testing can be performed. This can be done by means of a manipulator 7.

The manipulator 7 has a carriage 8, which takes the form of a circular segment and is movable in the circumferential direction of the nozzle 3. A sled 9 is displaceable on the carriage 8 in the axial direction of the nozzle 3. A scissors half 10 which is disposed on the sled 9, has an upper arm 11 supported at one end in a shoulder joint 12 disposed on the sled 9. The other end of the upper arm is connected by another joint 13 to a lower arm 14. A holder 16 for a probe 17 is connected to the free end of the lower arm by a further joint 15. The joints 12, 13, 15 are rotatable about axes that are at right angles to the path of the sled 9 or the axis of the nozzle.

Figure 2:
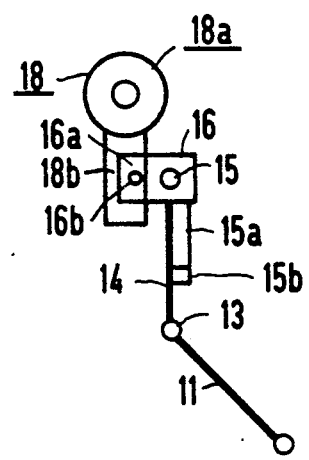
FIG. 2 is a side-elevational view of scissors half of the manipulator of FIG. 1, having a tool constructed as a cutting or severing tool being disposed on a holder.
Figure 9:
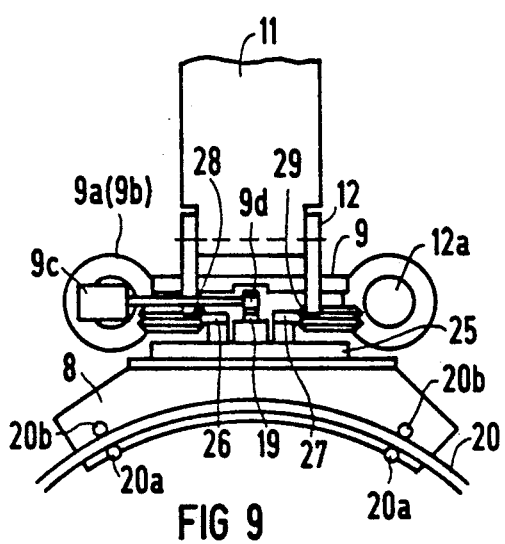
FIG. 9 is a fragmentary, end-elevational view of the manipulator shown in FIG. 8.

Before testing work is begun, the insulation 5 is cut away in the region of the vessel to be tested by means of a cutting or severing tool disposed on the manipulator 7. As FIG. 2 shows, a tool 18, such as a grinder or cutter 18a having a drive motor 18b, is disposed on the holder 16 in order to cut away the insulation. The holder 16 for the tool 18 has a retainer 16a with a fast-action closure element 16b and is connected to the lower arm 14 by the joint 15. The holder can be pivoted by a gear relative to the lower arm 14 by means of a drive motor 15a having position transducers 15b. As seen in FIG. 9, a rack drive mechanism is used to displace the sled 9, to which the scissors half is pivotably attached by the shoulder joint 12. The rack drive mechanism has a drive motor 9a being disposed on the sled 9 and having an angular gear 9c and a pinion 9d, which meshes with a rack 19 secured to the carriage 8. The rack is provided with a toothless guide element 19a for rerailing and derailing the sled 9. This structure permits time-saving installation and dismantling of the manipulator.

Figure 8:
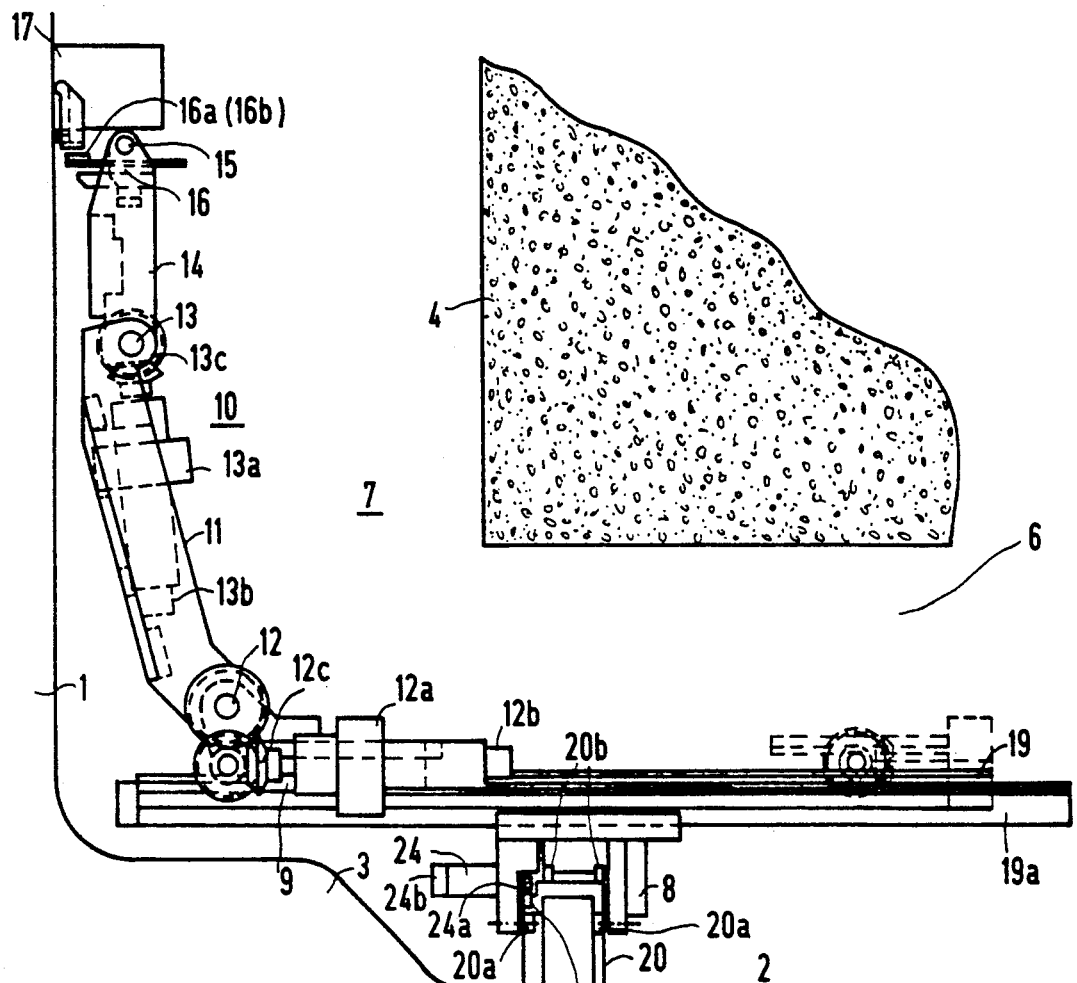
FIG. 8 is a fragmentary, enlarged side-elevational view showing further details of the manipulator.

As seen in FIGS. 8 and 9, in order to adjust the pivoting angle of the upper arm 11, another drive motor 12a is associated with the shoulder joint 12. The pivoting angle of the upper arm 11 is adjustable with the motor 12a through a gear, in particular another bevel gear 12c. Analogously, in order to adjust the pivoting angle of the lower arm, a further drive motor 13a is associated with the joint 13 between the upper and lower arms. The motor 13a enables adjustment of the angle between the upper arm and the lower arm through a gear, in particular a further bevel gear 13c.

It is advantageous for the length of the lower arm 14 to be less than that of the upper arm 11, and in particular for it to be approximately two-thirds the length of the upper arm. This makes it possible to fold the arms up against the carriage 8 and thus move the probe 17 into a position in which it is accessible from outside, even under cramped conditions. In this connection, the scissors half is constructed in such a way that the lower arm 14 can be folded back onto the upper arm 11, and the upper arm 11 can be laid flat against the carriage 8.

Figure 3:
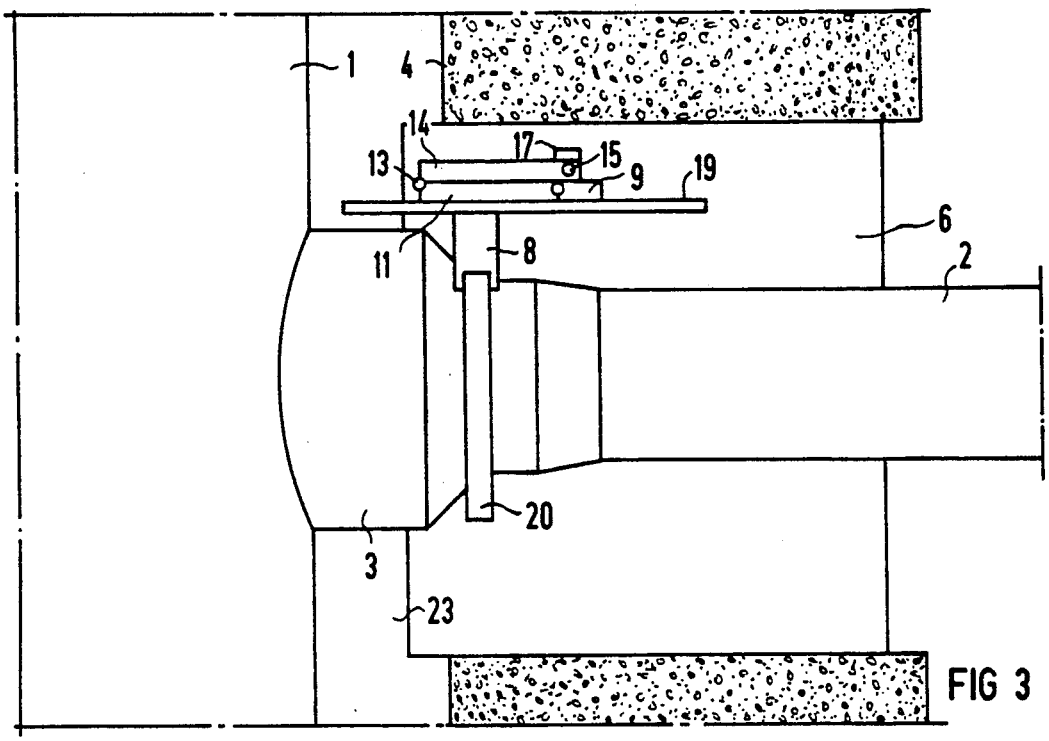
FIG. 3 is a view similar to FIG. 1 of the manipulator thereof in the installed position, with its arms folded up.

FIG. 3 is a basic illustration showing a manipulator in the folded-up position. In this case, the upper arm 11 and the lower arm 14 are shown with equal length, because there is enough room available for the manipulator. In the position shown, the manipulator can be introduced through the opening 6 of the biological shield 4. Before this introduction, the manipulator is mounted on a non-illustrated installation device in a manner known per se. The device substantially includes divided scissors halves placed around the pipeline 2, with the aid of which the manipulator is thrust into the opening 6.

The probe 17 is then easily accessible from outside, as can be seen from FIG. 3. As a result, a change to another probe or tool can be performed in a very brief time, and the radiation exposure to operating personnel can be considerably lessened.

Figure 4:
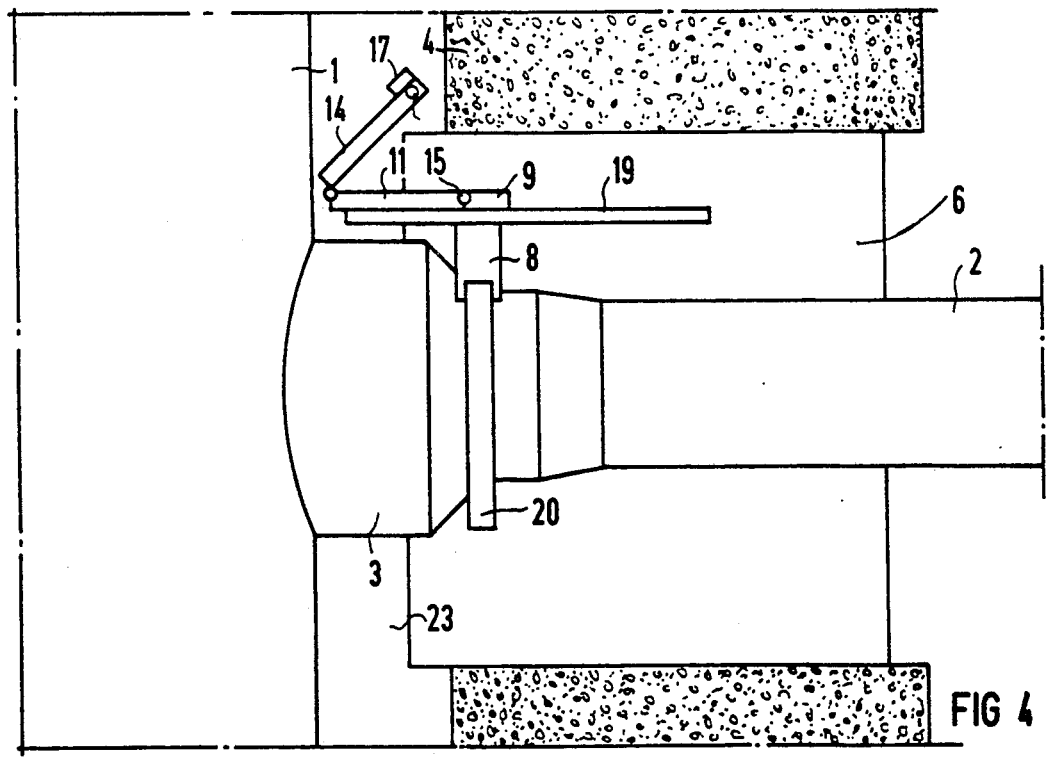
FIGS. 4, 5 and 6 are views similar to FIG. 1 showing the unfolding and insertion of the arms.
Figure 5:
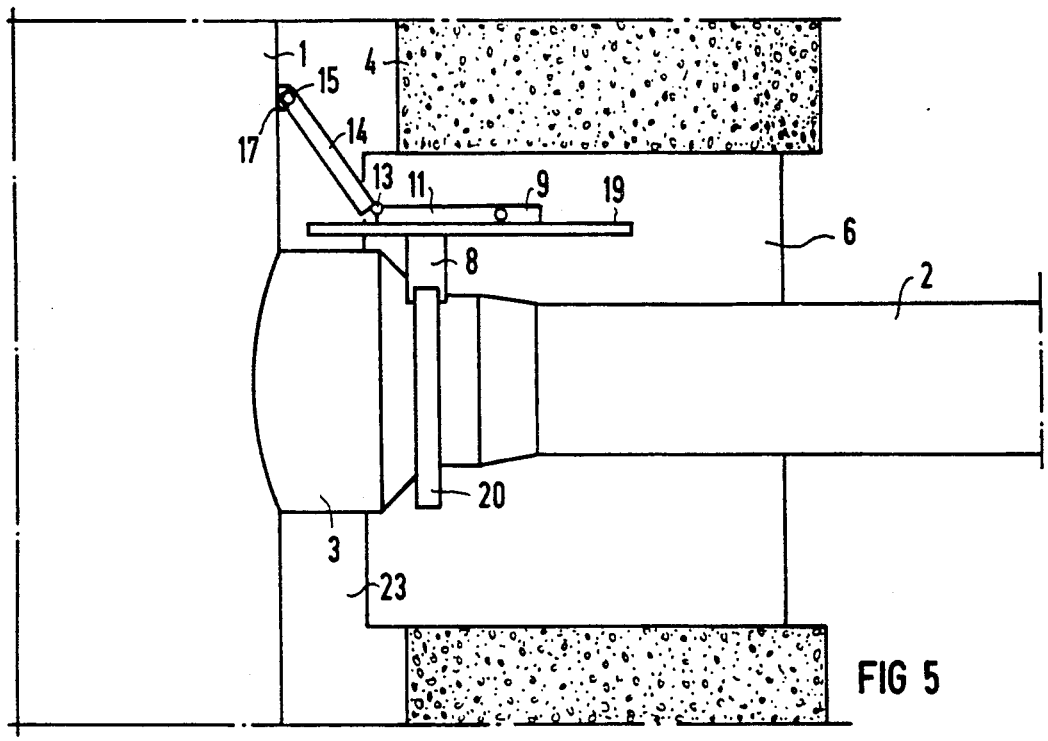

In a position that is inclined from the vertical by 45 degrees, there is enough room to fold the lower arm upward as seen in FIG. 4, and to position it against the wall of the vessel 1, as seen in FIG. 5.

Figure 6:
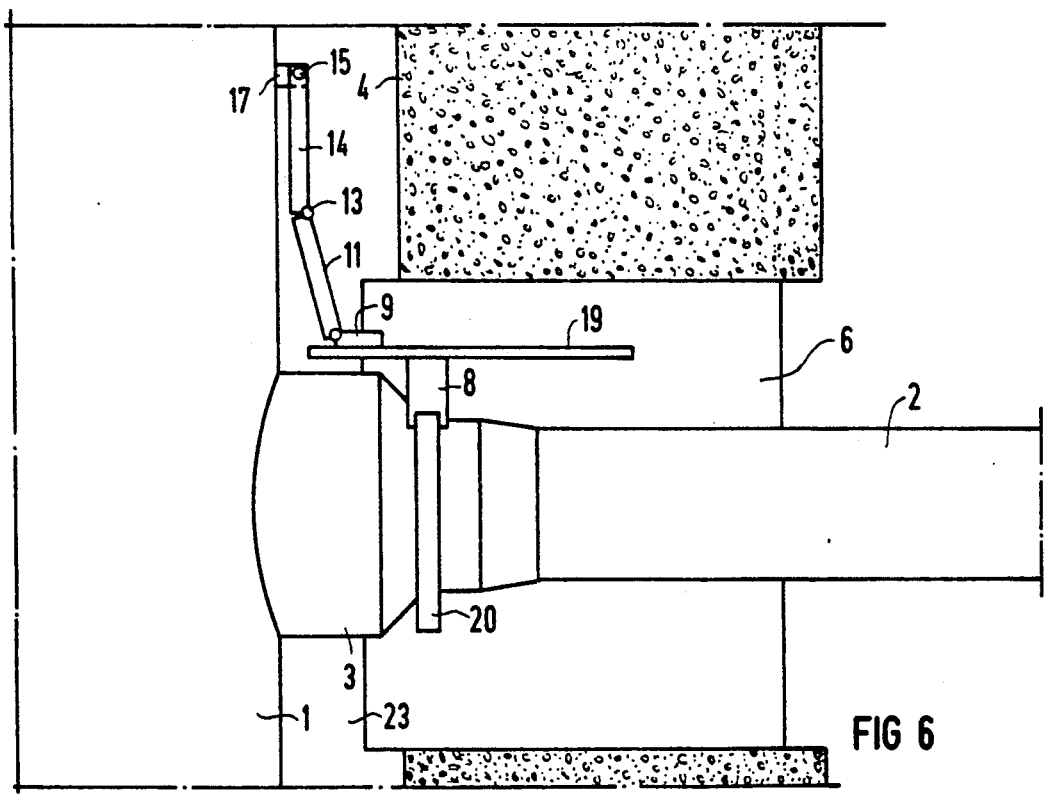

Through the use of a coordinated motion, in which pivoting of the upper arm 11 and the lower arm 14 and movement of the sled 9 with the joint 15 take place, the manipulator with the probe in place is moved to its maximum projection seen in FIG. 6. From there, the probe can be moved in the circumferential direction of the nozzle 3. To this end, the carriage 8 is rerailed onto an annular rail 20 that coaxially surrounds the nozzle 3. Since the test path runs along a saddle-shaped curve, the sled 9 is displaced axially in the course of the movement of the carriage 8 in the circumferential direction, in such a way that the holder 16 and joint 13 move along the predetermined path, in particular along a path that is at least approximately parallel to the surface to be tested.

The electric drive motors 9a, 12a, 13a, which are powered by an electrical power system 21 seen in FIG. 1, are provided as drive mechanisms for the courses of motion, and they are provided with a position transducer 9b, another position transducer 12b and a further position transducer 13b. A control device 22 having a computer is provided for controlling the drive motors.

Figure 7:
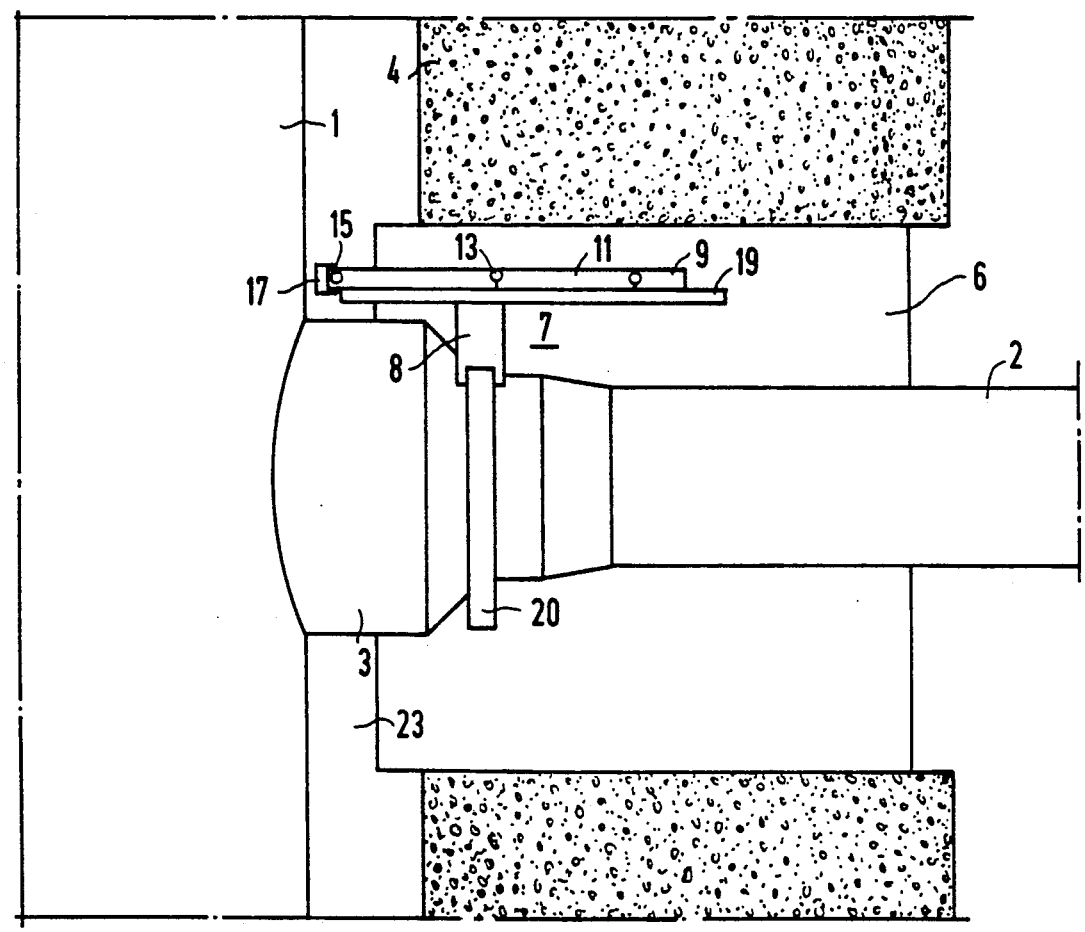
FIG. 7 is another view similar to FIG. 1 showing the introduction of the manipulator thereof with the arms in the outstretched position.

FIG. 7 shows the introduction of the manipulator, in the outstretched position of the arms 11, 14 with the probe 17 oriented toward the vessel 1. The manipulator can be introduced in this position even when only a very small opening in the biological shield and only a narrow annular gap 23 are available.

A practical embodiment of a manipulator 7 for handling operations can be seen from the side and end views of FIGS. 8 and 9. The carriage 8 is supported on the annular rail 20 by means of pairs of rollers 20a, 20b and is driven by an electric motor 24 having position transducers 24b. The motor 24 acts through a pinion 24a on a rack 20c.

The carriage 8 has a base plate 25 on which two guide rails 26, 27 for guiding the sled 9 and the rack 19 are disposed, parallel to the axis of the nozzle. Guide rollers 28, 29 having a prism-shaped groove are rotatably supported on the sled 9 and engage a prism-shaped protrusion on the guide rails.

Associated with the rack 19 is the pinion 9d, which is driven by the motor 9a that has the position transducers 9b and is secured to the sled 9.

The probe 17 disposed on the tip of the scissors half has the retainer 16a with the fast-action closure 16b and is suspended in a gimbal mounting on the lower arm 14 through the joint 15.

We claim:

1. Manipulator for handling operations for non-destructive testing in the vicinity of the nozzle of a vessel in the primary loop of a nuclear power plant, comprising a carriage, means for moving said carriage in circumferential direction around a nozzle of a vessel, a sled disposed on said carriage, means for displacing said sled in the axial direction of the nozzle, a shoulder joint disposed on said sled, a scissors half having an upper arm with one end pivotably supported in said shoulder joint and another end, a lower arm with a free end, another joint pivotably connecting the other end of said upper arm to said lower arm, a holder, and a further joint pivotably connecting said holder to the free end of said lower arm.

2. Manipulator for handling operations in the vicinity of the nozzle of a vessel, comprising a carriage, means for moving said carriage in circumferential direction around a nozzle of a vessel, a sled disposed on said carriage, means for displacing said sled in the axial direction of the nozzle, a shoulder joint disposed on said sled, a scissors half having an upper arm with one end pivotably supported in said shoulder joint and another end, a lower arm with a free end, another joint pivotably connecting the other end of said upper arm to said lower arm, a holder, and a further joint pivotably connecting said holder to the free end of said lower arm.

3. Manipulator according to claim 2, including a tool disposed on said holder.

4. Manipulator according to claim 2, including a probe disposed on said holder.

5. Manipulator according to claim 2, including a rack drive mechanism for displaceably supporting said shoulder joint on said sled.

6. Manipulator according to claim 5, wherein said rack drive mechanism has a rack being disposed on said carriage and having a toothless guide element for rerailing and derailing said sled.

7. Manipulator according to claim 2, including a drive motor with a position transducer and a gear operatively connecting said drive motor and said sled for adjusting the position of said sled, and a control device connected to said position transducer.

8. Manipulator according to claim 7, including another drive motor with another position transducer and another gear operatively connecting said other drive motor and said shoulder joint for adjusting a pivoting angle of said upper arm, said control device being connected to said other position transducer.

9. Manipulator according to claim 7, including a further drive motor with a further position transducer and a further gear operatively connecting said further drive motor and said other joint for adjusting a pivoting angle between said upper and lower arms, said control device being connected to said further position transducer.

10. Manipulator according to claim 8, including a further drive motor with a further position transducer and a further gear operatively connecting said further drive motor and said other joint for adjusting a pivoting angle between said upper and lower arms, said control device being connected to said further position transducer.

11. Manipulator according to claim 10, wherein said gears are bevel gears.

12. Manipulator according to claim 1, wherein said other joint includes means for permitting said lower arm to be folded back onto said upper arm, and said shoulder joint includes means for permitting said upper arm to be folded onto said carriage.

13. Manipulator according to claim 1, wherein said lower arm has a shorter length than said upper arm.

14. Manipulator according to claim 1, wherein said lower arm is approximately two-thirds the length of said upper arm.

15. Manipulator according to claim 1, including an annular rail to be disposed concentrically about the nozzle of the vessel, and means for derailing said carriage from and rerailing said carriage onto said rail.

* * * * *